United States Patent

Baker

[19]

[11] Patent Number: 6,157,889

[45] Date of Patent: Dec. 5, 2000

[54] LOAD DISTRIBUTION SYSTEM FOR HAULAGE TRUCKS

[75] Inventor: Mark R. Baker, Tucson, Ariz.

[73] Assignee: Modular Mining Systems, Inc.

[21] Appl. No.: 09/397,189

[22] Filed: Sep. 16, 1999

[51] Int. Cl.$^7$ .................................................. G06F 17/00
[52] U.S. Cl. .................... 701/124; 702/127; 702/173; 702/174; 37/348; 37/411; 37/419
[58] Field of Search ................................. 701/124, 50, 35; 702/127, 173, 174; 37/348, 411, 419; 414/699

[56] References Cited

U.S. PATENT DOCUMENTS

| | | | |
|---|---|---|---|
| 5,067,572 | 11/1991 | Kyrtsos et al. | 177/139 |
| 5,528,499 | 6/1996 | Hagenbuch | 364/424.07 |
| 5,631,832 | 5/1997 | Hagenbuch | 364/424.04 |

*Primary Examiner*—William A. Cuchlinski, Jr.
*Assistant Examiner*—Yonel Beaulieu
*Attorney, Agent, or Firm*—Antonio R. Durando

[57] ABSTRACT

Weight sensors coupled to the bed of a conventional haulage truck measure the weight applied to each tire strut as the truck is being loaded. Based on the weight applied to each strut, the exact position of the center of gravity of the load in the truck's bed is calculated and displayed on a monitor relative to a target position deemed optimal for uniform weight distribution. Based on this information, the operator of the loading machine can complete the loading operation in such a way as to shift the center of gravity toward the chosen target position. In another embodiment of the invention, an automated algorithm calculates and displays where the next bucket load should be dropped, based on its approximate weight, in order to shift the center of gravity toward the target location.

31 Claims, 7 Drawing Sheets

LOAD DISTRIBUTION SYSTEM FOR HAULAGE TRUCKS

BACKGROUND OF THE INVENTION

1. Field of the Invention

This invention is related in general to the field of equipment for controlling the distribution of weight on haulage trucks and, in particular, to a system for placing the center of gravity of a load at a predetermined desired spot on a truck bed.

2. Description of the Related Art

Surface mines utilize large haulage trucks for moving material from the mine pit to processing plants and waste disposal areas. These trucks operate back and forth between loading and discharge points over roadways in and around the mine pit, repeatedly carrying as much as 400 tons of material. The trucks are designed to promote the even distribution of the material loaded onto them irrespective of whether they are loaded from the front, sides, or back of the bed. The bed geometry includes sloped walls and a tilted bottom that effectively reduce the natural angle of repose of the material loaded so that it will flow to a relatively uniform pile. As in the case of conventional trucks, the weight of the load is typically distributed over four or more wheels located approximately at the corners of the truck bed for stability and convenience.

Most work machines that are used for loading trucks, such as excavators, shovels, backhoes and the like, are human-operated, mobile pieces of equipment constantly being moved around on the surface of the mine. Skilled operators ensure that the machine is positioned in the right place and is optimally oriented to perform its intended function. For example, an excavator operator will ensure that the undercarriage of the machine is sufficiently close to the minable seam and that its; boom is oriented so as to permit the bucket of the machine to reach and extract a full load of material, and to reach a haulage truck positioned for receiving the load. Similarly, a truck operator will ensure that the vehicle is within the comfortable and safe reach of the excavator's boom.

During normal mine operation, each truck is loaded by placing it under the bucket of the shovel or other mining equipment, such that its contents can be released directly onto the truck's bed. Typically, at least three bucket loads are required to fill the bed to capacity. Therefore, depending on the position of the bucket with respect to the truck's bed at each loading step, the loaded material may be distributed unevenly in spite of the truck's design. Since it is known that an uneven load may cause excessive wear of a tire and/or non-uniform wear among the sets of tires in service on a given truck, it is desirable to spread the load as evenly as possible. Furthermore, with the advent of operator-less equipment, information about load distribution will also be useful for determining the optimal placement of material by automated on-board shovel-control system.

Haulage trucks utilize very expensive oversize tires that are rated and maintained on the basis of tonnage and speed; that is, tire ratings are expressed in terms of expected ton-mile/hour or tmph. The tonnage, mileage and speed of operation of each truck are recorded for maintenance purposes and the tires are routinely replaced when their tmph rating is reached. Obviously, such timely replacement is not only an issue of proper maintenance but, given the size of the loads carried and the conditions of the roads traveled, it is also a safety concern. Therefore, the condition of truck tires at all times is very important to a mining operation.

In order to address some aspects of this problem, monitoring systems have been developed to track the loading and haulage operation of surface mining vehicles. For example, U.S. Pat. No. 5,528,499 and U.S. Pat. No. 5,631,832 describe systems for processing data derived from the weight of a load carried by a haulage vehicle. These systems include pressure sensors distributed under the bed of the vehicle to detect the weight of a load for deriving data indicative of hauling conditions. Historical as well as current data are used to formulate management decisions regarding future operations intended to achieve a predetermined management goal.

The prior art does not disclose a system for affecting the load distribution on a haulage truck being loaded. Therefore, known methods and apparatus are not suitable for providing an even distribution of the load placed on a haulage truck bed, as required to minimize tire wear and ensure safe operation of the haulage vehicles in a typical mining environment. The present invention provides a procedure and an apparatus that overcome these deficiencies.

BRIEF SUMMARY OF THE INVENTION

The primary objective of this invention is a system for distributing the weight of material loaded onto a haulage truck uniformly among the vehicle's tires.

A related objective is a loading procedure and apparatus for loading material on the bed of a truck such that the load's center of gravity is substantially equidistant from the bearing strut of each tire.

Still another objective is a system that provides information about the current weight distribution of material in a truck bed during the loading operation.

Another goal is a system that facilitates the positioning of the bucket of a loading machine relative to the bed of a haulage truck such as to produce a substantially uniform weight distribution.

Still another objective is a system that is suitable for incorporation within existing loading machine's and related instrumentation.

A final objective is a system that can be implemented easily and economically according to the above stated criteria.

Therefore, according to these and other objectives, the preferred embodiment of the present invention includes weight sensors coupled to each tire strut in a conventional haulage truck to measure the weight applied to each strut as the truck is being loaded. Based on the weight applied to each strut, the exact position of the center of gravity of the load in the truck's bed is calculated and displayed on a monitor relative to a target position deemed optimal for uniform weight distribution. Based on this information, the operator of the loading machine can complete the loading operation in such a way as to shift the center of gravity toward the chosen target position. In a more sophisticated embodiment of the invention, an automated algorithm calculates and displays where the next bucket load should be dropped, based on its approximate weight, in order to shift the center of gravity toward the target location.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

The present invention consists of apparatus and a procedure for identifying the location of the center of gravity of a heap of loose material loaded on a truck so that an operator can make adjustments to try and shift it to an optimal target position by appropriately positioning each successive bucket load. This improvement in the loading operation produces better driving performance of the truck, longer tire life, and improved maintenance and safety records.

Figure 1:
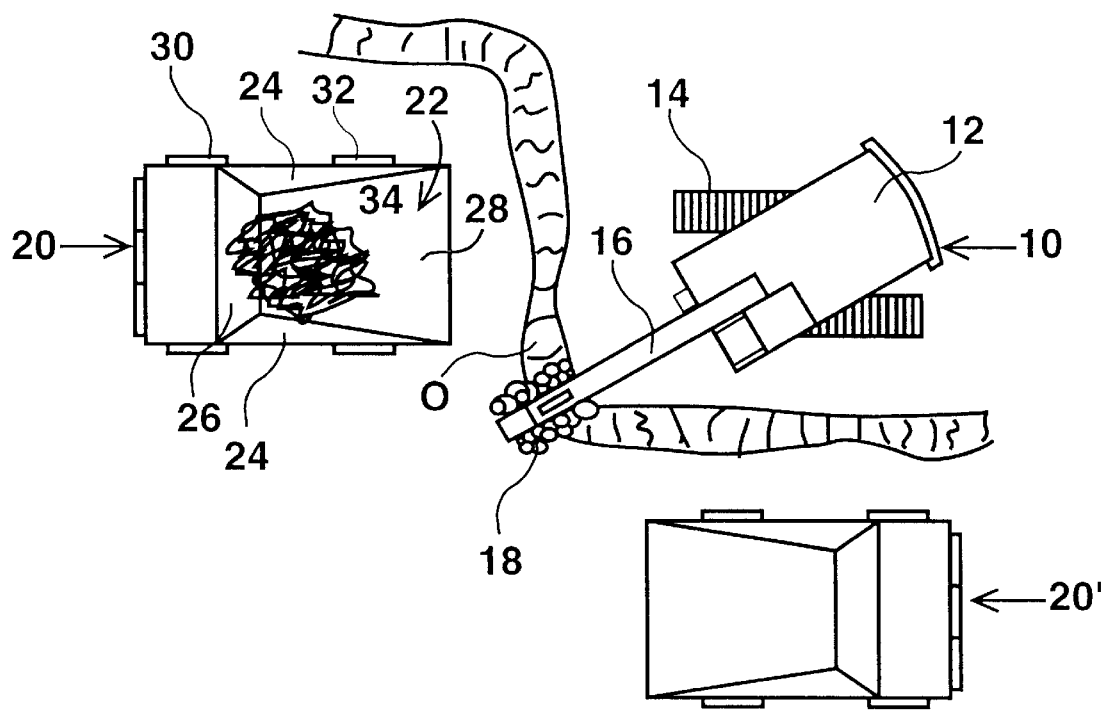
FIG. 1 is a schematic plan view of an excavator loading haulage trucks by conventional eye-sight operation.

For the purposes of this disclosure, it is understood that every reference to an operator is intended to apply as well to an on-board automated control system. Referring to the drawings, wherein like parts are designated throughout with like numerals and symbols, FIG. 1 illustrates in plan view a conventional mining machine 10, such as a shovel-type excavator, used in surface mining operations. Such equipment includes a car body 12 rotatably mounted on an undercarriage 14 for moving the machine within the work site, an articulated boom 16, and a shovel bucket 18. As part of the normal surface mining process, the bucket 18 is filled with mined ore or other material, the boom 16 is swung around to reach the bed of a haulage truck 20 parked within its reach, and the mined material is released onto the trucks's bed 22. The boom is then swung back toward the ore seam O and the operation is repeated until the truck is fully loaded. While a first truck 20 is being loaded, a second truck 20' may place itself in position for the next loading operation. Typically, modern haulage trucks can carry about 300 tons of ore and three to five bucket loads of an excavator are normally required to fill them to capacity.

Figure 2:
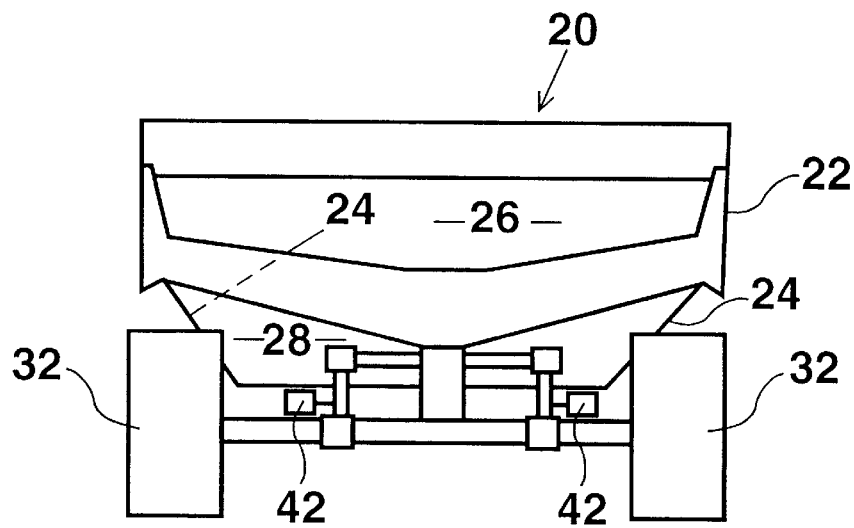
FIG. 2 is a schematic elevational view of the back of a conventional haulage truck illustrating the slanted sides of the truck's bed.
Figure 3:
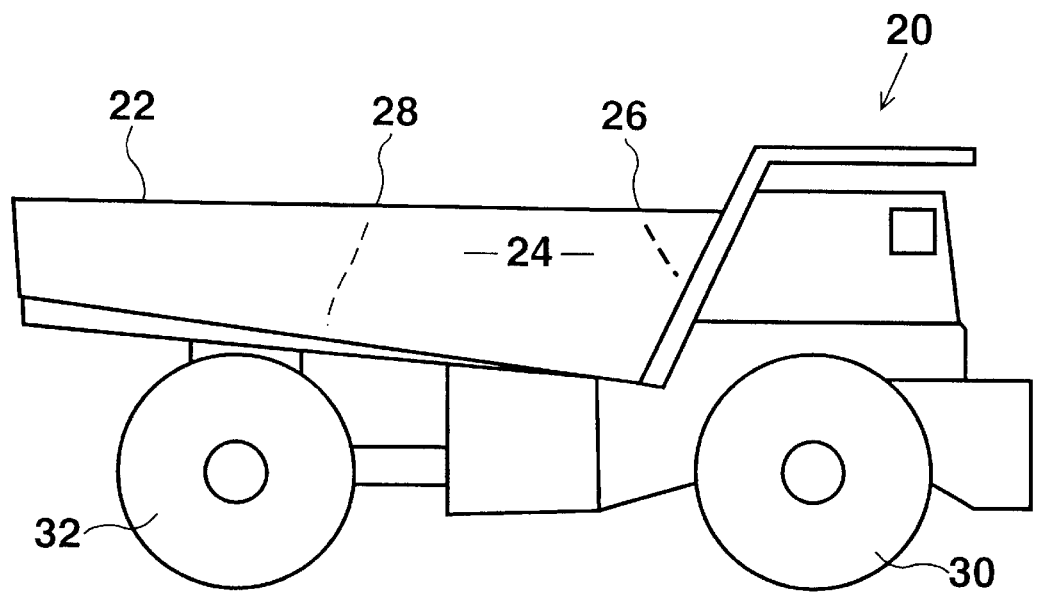
FIG. 3 is a schematic elevational view of the right side of a conventional haulage truck illustrating the slanted bottom surfaces of the truck's bed.
Figure 4:
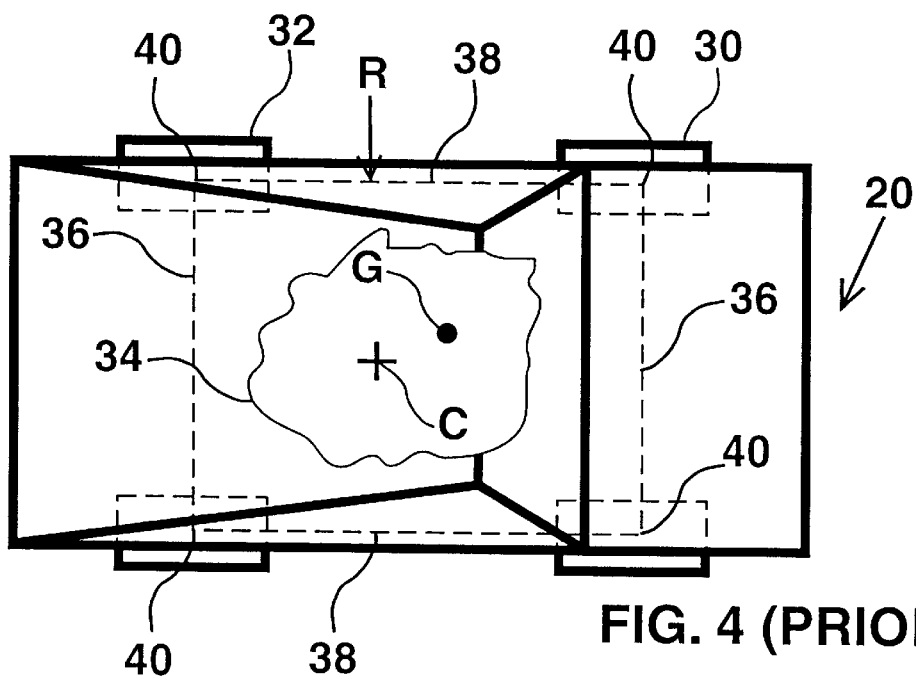
FIG. 4 is a schematic plan view of a conventional haulage truck illustrating the position of the bed and a hypothetical load of material with respect to the wheels.

As also illustrated in the schematic back and side elevational views of FIGS. 2 and 3, the bed 22 of a typical truck 20 is defined by sloped side walls 24 and bottom surfaces 26,28 that promote the flow of loose material being loaded toward the center of the bed, so that the material is distributed mostly within the area bound by the truck's wheels and approximately midway between the front and rear sets of wheels 30 and 32, respectively. As each bucket is unloaded on the bed 22 of the truck 20, a pile of material 34 is formed with a random weight distribution having a center of gravity G falling somewhere within a rectangle approximately defined in a horizontal plane by the spots where the wheels 30,32 meet the ground. As shown by the dotted line in FIG. 4, such a rectangle R is roughly bordered by the centerlines of the front and rear axles 36 and the lines 38 passing approximately through the middle of the tires 30,32 on each side of the vehicle. Ideally, the center of gravity G of the pile 34 would coincide with the center C of the rectangle R; that is, the point that is equally distant from each corner 40 corresponding to each tire 30,32 in the rectangle, such that each tire supports the same weight and an even distribution of the load is achieved.

Figure 5:
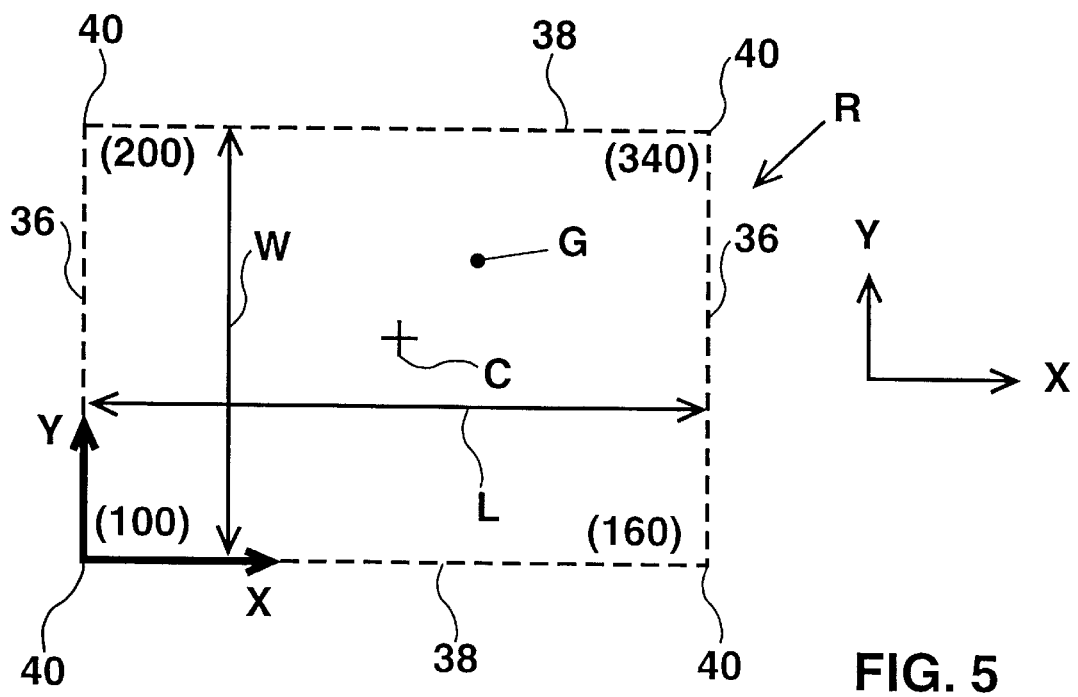
FIG. 5 is a schematic representation of a rectangular area defined by the location of four weight sensors coupled to the bed of a truck and of the position of the center of gravity of a pile of material in the bed producing predetermined weight measurements at each sensor location.

In order to practice the invention and approximate this ideal result, a weight sensor 42 is mounted at a predetermined location under the bed 22, preferably in the proximity of each wheel, such as on each strut (FIG. 2), on the wheel axles, or in other appropriate positions compatible with the geometry of the haulage vehicle. Alternatively, any other type of sensor, such as frame stress monitors located at key positions or other sensors located on the bed suspension machanisms, could be used to determine the load-weight distribution as described herein. By knowing the exact position of and the weight measured by each sensor, the location of the center of gravity on the substantially horizontal plane of the truck's bed (hereinafter defined as the x,y plane) is easily calculated. Note that three or more sensors are sufficient to calculate the x,y position of the center of gravity G of a pile loaded on the bed. Using the rectangle R for illustration and assuming that four weight sensors are used positioned so as to coincide with the rectangle's corners 40, the center of gravity G can be calculated simply by independently finding its x position between the front and rear axles 36 and its y position between the right and left sides 38. As illustrated in FIG. 5, assume for example that each sensor measures the units of weight listed at each corner of the rectangle R (100, 200, 340, and 160 moving clockwise from the rear right corner of the truck, taken to be the origin of the x,y coordinates of the plane of reference). As one skilled in the art would readily recognize, if the rectangle R has length and width dimensions L and W, respectively, the x and y coordinates of the center of gravity of the load producing these weight measurements will be x=500/800L=0.62L and y=540/800W=0.67W, respectively. Thus, the position of the center of gravity G with respect to the ideal point C (presumed to be the center of the rectangle for illustration) is readily identified as the point having coordinates x=0.62L and y=0.67W from the origin.

In some applications it may be advantageous to only determine the x or y position of the center of gravity of the load in a truck, rather than both coordinates. That may be the case when operational requirements make it desirable to place the load either centrally with respect to the right and left sides of the truck or at a predetermined position along its length. Obviously, in such cases only two sensors, placed either longitudinally or transversely, are sufficient to provide the necessary information following the procedure outlined above.

Figure 6:
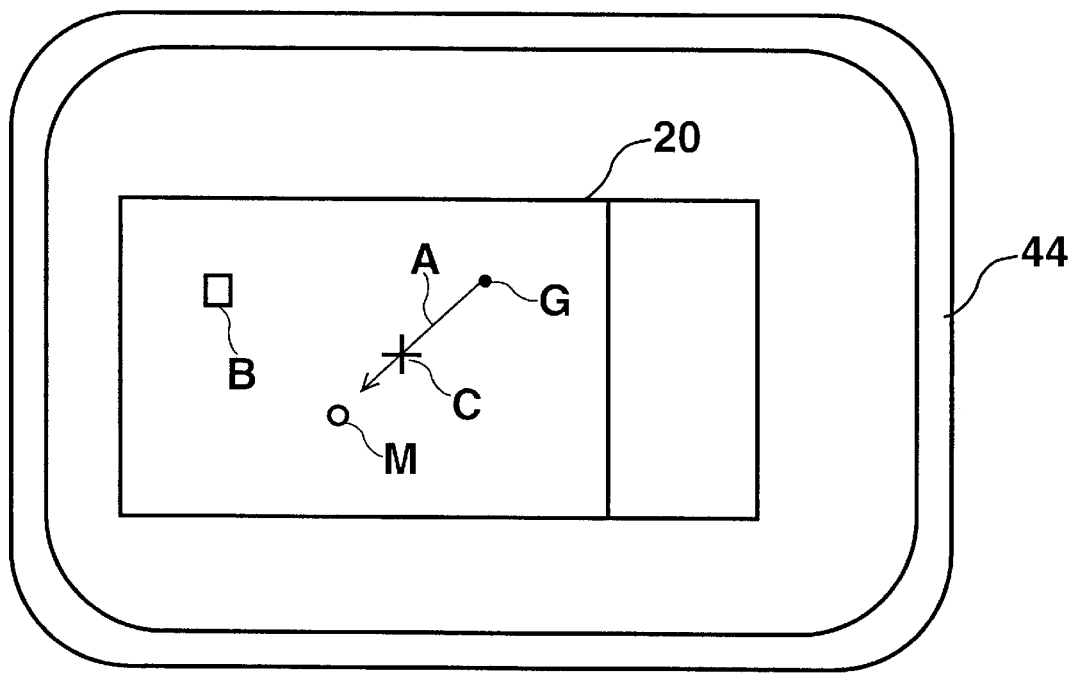
FIG. 6 is a schematic representation of a monitor screen showing the present position of the center of gravity of a load with respect to a target location in the bed of a truck being loaded, and also showing the current position of an excavator's bucket and its preferred location for releasing its next load.

According to one aspect of the invention, the mining machine 10 is preferably equipped with a display monitor 44, illustrated in FIG. 6, showing the position of the load's center of gravity G relative to the target point C in the truck's bed. It is noted that the target point C has been illustrated as the center of the rectangle R defined by the four wheels of the vehicle, but it is clear that any other point in the bed may be selected, if desirable for any reasons, and that the invention can be practiced in equivalent fashion with reference to any such target point. For example, the geometry of the truck bed and the chassis characteristics of the vehicle may warrant shifting the center of gravity forward or backwards. In any event, in order to generate the information required for the display of FIG. 6, the vehicle 20 must be equipped with a positioning system capable of tracking the vehicle's location and orientation, such as provided by at least two GPS (Global Positioning System) units mounted at known points in the vehicle and linked (either directly or indirectly to a computer providing the input to the monitor 44. It is also noted that the exact position of each weight sensor 42 is known once the position of the truck 20 is determined because of the sensors' fixed geometric relationship to the GPS units. Similarly, the location of the target point C is known. Therefore, once the location of the center of gravity G is calculated based on the weight information provided by the sensors 42, all data required for the display illustrated in FIG. 6 are available.

Based on the horizontal separation of the current center of gravity G of a load 34 on a truck with respect to the target point C, an operator can judiciously adjust the approximate position of the bucket 18 for releasing the next load so as to shift the center of gravity toward the target C, as illustrated by the arrow A in the figure. Obviously, the operator would try and dump the next load at a point on the side of the target opposite to the current center of gravity along a line passing through both points G and C, as illustrated by a marker M in the figure by way of example. After the next load is released, the system calculates an updated position of the center of gravity G for the operator's next selection of a point of release. By following this procedure as each bucketful is loaded on the bed 22, the operator can utilize the feedback provided by the system to ensure an approximately optimal weight distribution of the material loaded on the truck 20. The word approximate is used because clearly the release of each bucket load would only be roughly optimal in spite of the feedback and because the subsequent distribution of the new material is always uncertain.

According to another embodiment of the invention, the position of the bucket 18 is also displayed on the monitor 44 for the operator's viewing while positioning the next bucketful over the bed of the truck. This feature requires that the excavator 10 be also equipped with a positioning system capable of tracking the current location of the bucket 18. Thus, the position of the bucket can be displayed currently in the form of a moving image B that the operator can use to place the bucket in the presumed selected position shown as M on the monitor 44.

Figure 7:
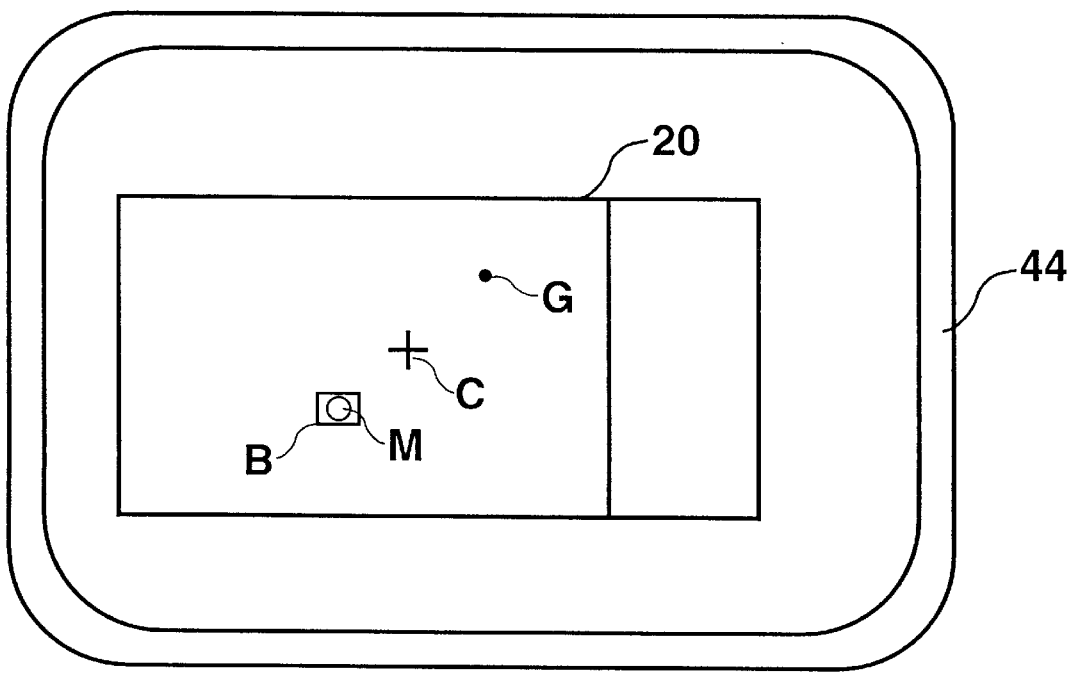
FIG. 7 is a view of the screen of FIG. 6 after the bucket has been moved to the preferred location for releasing its load.

In a yet more sophisticated version of this embodiment of the invention, the system also calculates and displays the actual position of the point M where the next load needs to be dumped in order to shift the current center of gravity G to coincide with the center C of the truck bed 22. Thus, the operator would no longer estimate that position using common sense and educated judgement, but would simply follow the indication provided by the system via the screen 44. As would be clear to those skilled in the art, the calculation of the theoretical location M for release of the next load requires a knowledge of the total weight currently already loaded in the truck and of the weight of the next bucketful expected to be dumped. The former piece of data is readily available to the system by keeping track of the cumulative weights measured by the sensors 42 after initialization when the truck 20 is first identified on arrival and linked to the load-control system of the invention; the latter can be advantageously approximated by the average weight of each bucketful. Thus, the system could be programmed to initially place the marker M to coincide with the center of the bed C as the initial target point for release of the first bucketful, and then to display the marker M at the calculated x,y position where each successive load should be dropped in order to shift the center of gravity G to the optimal point C. The operator achieves this result by visually following the image B on the screen of the monitor 44 and moving the boom and bucket of the excavator until the image B substantially coincides with the marker M, as illustrated in FIG. 7. In a completely automated system, the positioning of the bucket 18 could be achieved by a feedback-loop control module programmed to drive the bucket until the image B, corresponding to the position of the bucket 18, coincides with a setpoint represented by the calculated position of the marker M.

The weight-distribution concept of the invention is necessarily predicated on the availability of a positioning system providing the exact location and orientation of the bucket of the loading machine and the truck being loaded, as well as the availability of a communication system between the loading machine, the truck, and possibly a central computer station. It is noted that these positioning and communication facilities are necessary elements of an automated mining operation, of which this invention is intended to be an integral component; therefore, it is anticipated that the invention can be implemented in a relatively simple manner by further adding weight sensors to all haulage vehicles and by programming a microprocessor, either on board or at a central station, to perform the necessary calculations for determining the current position of the truck and its various relevant components, and for displaying the markers C, M and B on a monitor screen on board the excavator.

Figure 8:
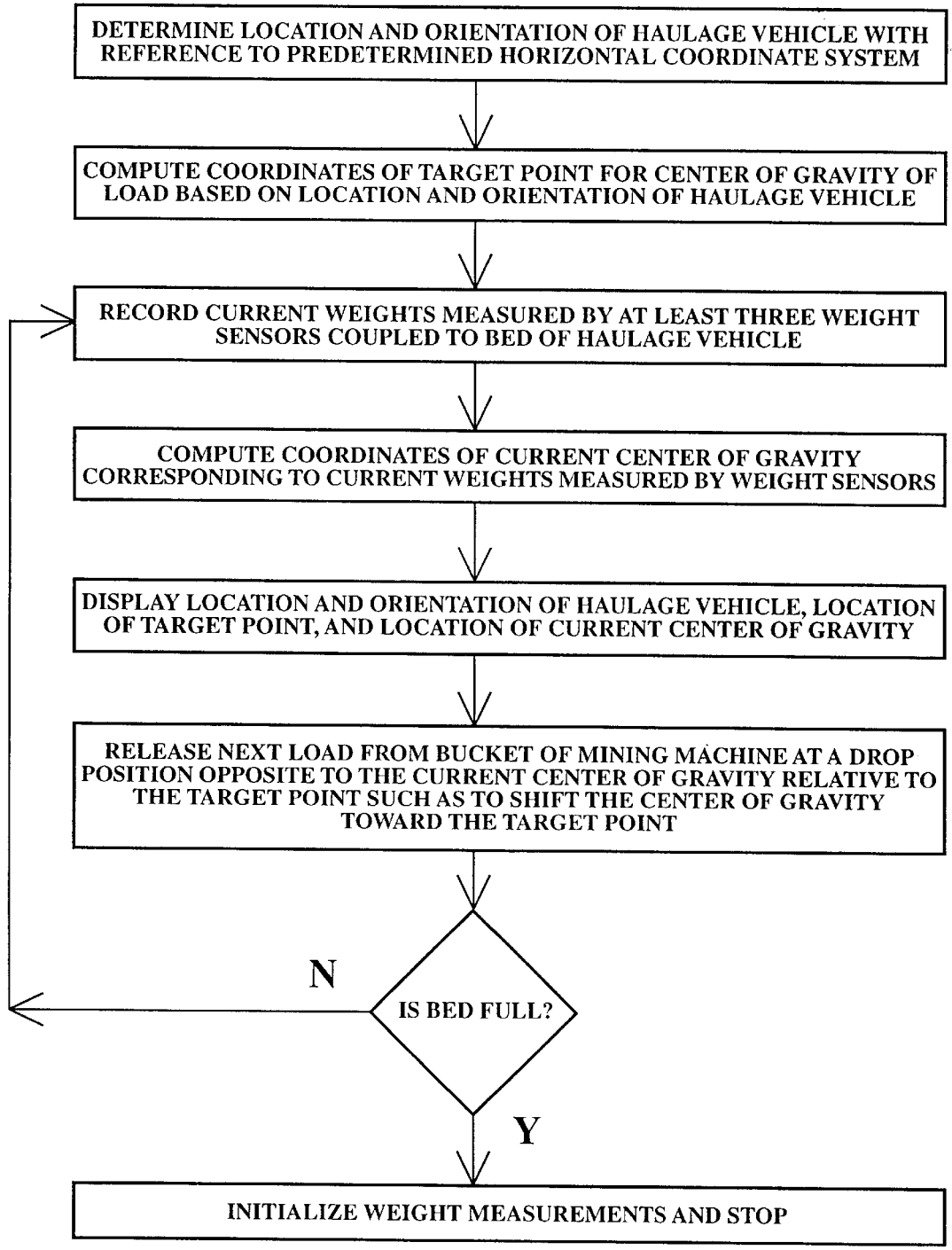
FIG. 8 is a flow diagram of the steps of the invention wherein an operator subjectively maneuvers the bucket of an excavator, based on the current position displayed on a monitor of the center of gravity of the load on a haulage vehicle, to a position judiciously selected to shift the center of gravity toward a desired target point also displayed on a monitor.
Figure 9:
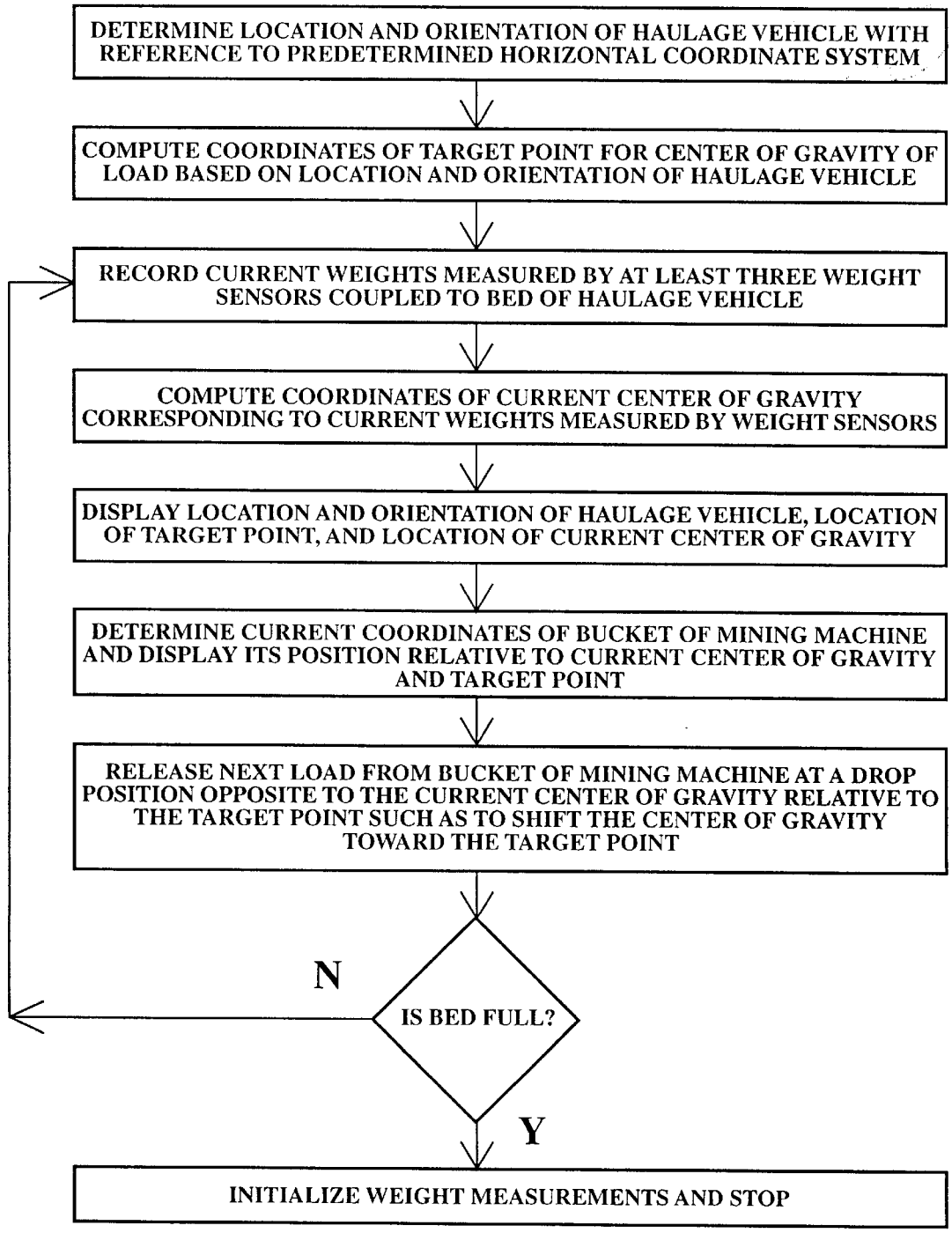
FIG. 9 is a flow diagram of the steps of the invention wherein an operator or an on-board automated control system subjectively maneuvers the bucket of an excavator, based on the current position of the center of gravity of the load on a haulage vehicle and of the bucket of the mining machine displayed on a monitor, to a position judiciously selected to shift the center of gravity toward a desired target point also displayed on a monitor.
Figure 10:
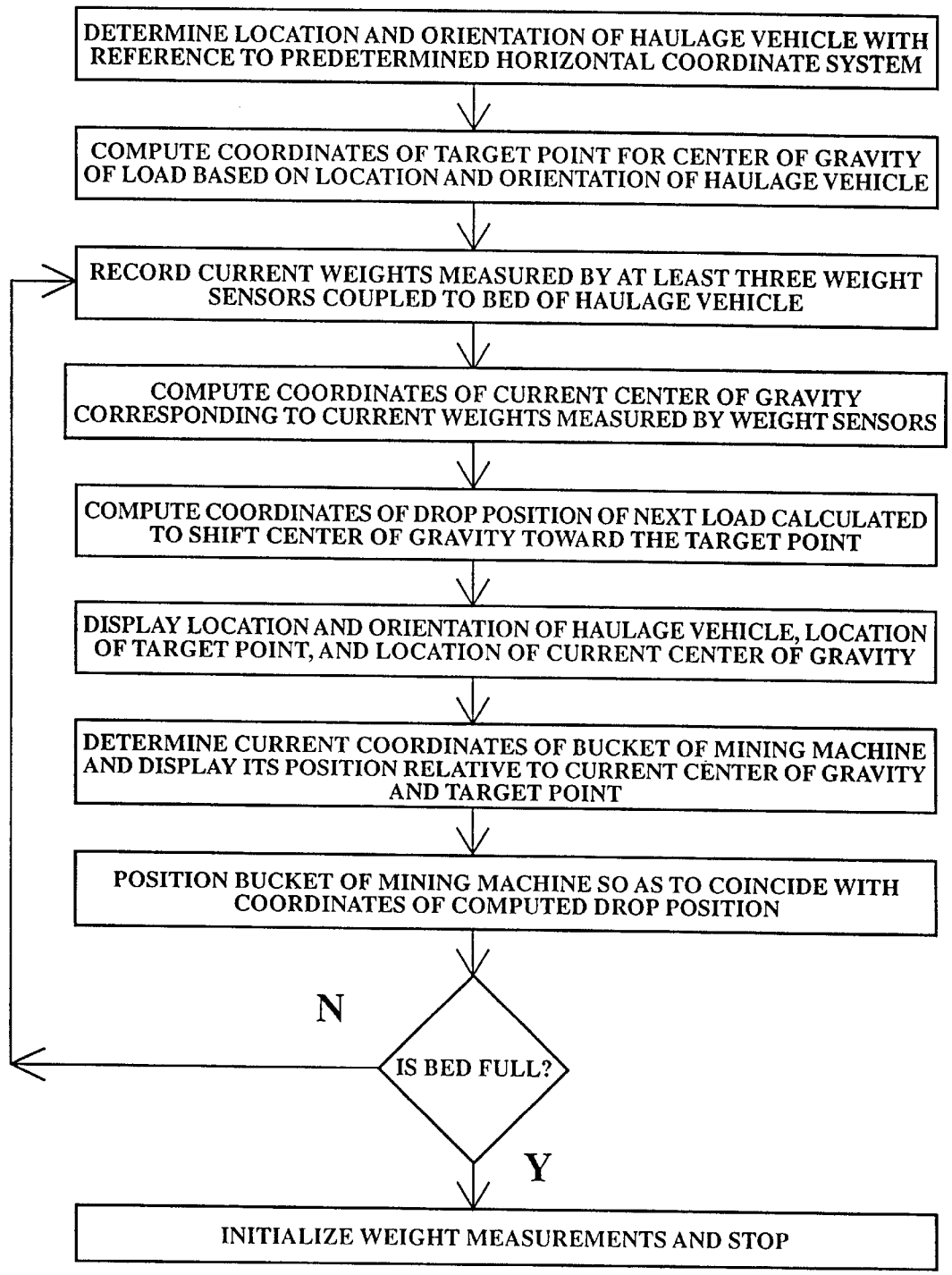
FIG. 10 is a flow diagram of the method of FIG. 9 wherein the optimal drop position for the bucket of the mining machine is also calculated and displayed on the monitor.

FIGS. 8, 9 and 10 illustrate in flow-diagram form the steps of the various embodiments of the invention detailed above. Obviously, a data processing system must be provided to enable the computations required to determine the position of the bucket 18 of the loading machine, the truck 20, and the markers C, M and B in real time. Such processing system preferably consists of a microprocessor, or a personal computer including a CPU, coupled to a data storage medium and a logic circuit or other programmed component that performs a series of specifically identified operations to implement the procedure of the invention. In the preferred embodiment, the current set of spatial coordinates is recorded periodically from GPS units mounted on the mining and haulage vehicles at ½- to 2-second intervals. These units provide coordinate information with an average accuracy within 3 cm, which is sufficient to implement the objectives; of the invention.

It is noted that the invention has been described with reference to x and y orthogonal coordinates defining a horizontal plane on the assumption that haulage vehicles being loaded will always lie on a substantially horizontal surface for reasons of convenience and safety. In those instances when that is not the case, it is clear that an error in the calculations will be introduced as a result of the off-plane position of the bed. Because of the approximate nature of the loading operation in a mine, this error is not deemed sufficiently significant to justify more complex measurements and calculations to provide a form of correction.

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and procedures. In particular, the invention has been detailed in the context of a surface mine operation because the disclosed embodiments have been conceived to solve maintenance and safety problems at a mine site. Nevertheless, it is understood that the principles of the invention are applicable to any situation where an advantage can be gained by controlling the weight distribution of a load on a transport vehicle.

I claim:

1. A method for controlling the location of the center of gravity of a pile of material being loaded on the bed of a haulage vehicle from a bucket of a loading machine, comprising the following steps:
    (a) providing at least two weight sensors coupled to said bed and disposed at predetermined positions within the haulage vehicle;
    (b) recording a weight measured by each of said weight sensors after a load of material is released from the bucket;
    (c) calculating a current position of a center of gravity of the pile of material loaded in the bed;
    (d) providing a spatial indication of said current position relative to a target point; and
    (e) releasing a subsequent load of material from the bucket from a drop position opposite to said current position of the center of gravity relative to the target point in order to shift said center of gravity toward the target point.

2. The method of claim 1, wherein said step (d) is carried out by displaying the position of the center of gravity and the target point.

3. The method of claim 2, further comprising the step of displaying the position of the bucket relative to the target point.

4. The method of claim 2, further comprising the step of calculating said drop position relative to the target point and displaying the drop position.

5. The method of claim 4, further comprising the step of displaying the position of the bucket relative to the drop position.

6. The method of claim 5, wherein said step (e) is carried out by automatically positioning the bucket such that the position of the bucket coincides with said drop position.

7. The method of claim 6, wherein said step (e) is carried out utilizing feedback-loop control.

8. The method of claim 1, wherein step (a) is carried out with four sensors.

9. The method of claim 1, wherein at least one of said steps (c) and (d) is carried out using global-positioning-system units.

10. The method of claim 2, wherein said displaying step is carried out on a monitor.

11. The method of claim 3, wherein said displaying step is carried out on a monitor.

12. The method of claim 4, wherein said displaying step is carried out on a monitor.

13. The method of claim 5, wherein said displaying step is carried out on a monitor.

14. The method of claim 6, wherein said displaying step is carried out on a monitor.

15. The method of claim 1, wherein said step (d) is carried out by displaying the position of the center of gravity and the target point on a monitor; and further comprising the steps of displaying the position of the bucket relative to the target point on said monitor, and of calculating said drop position relative to the target point and displaying it on the monitor.

16. An apparatus for controlling the location of the center of gravity of a pile of material being loaded on the bed of a haulage vehicle from a bucket of a loading machine, comprising:
    (a) at least two weight sensors coupled to said bed and disposed at predetermined positions within the haulage vehicle;
    (b) means for recording a weight measured by each of said weight sensors after a load of material is released from the bucket;
    (c) means for calculating a current position of a center of gravity of the pile of material loaded on the bed; and
    (d) means for providing a spatial indication of said current position relative to a target point.

17. The apparatus of claim 16, further comprising means for displaying the position of the center of gravity and the target point.

18. The apparatus of claim 17, wherein said display means includes a monitor.

19. The apparatus of claim 17, further comprising means for displaying the position of the bucket relative to the target point.

20. The apparatus of claim 19, wherein said display means includes a monitor.

21. The apparatus of claim 17, further comprising means for calculating a drop position for shifting said center of gravity toward the target point and means for displaying said drop position relative to the target point.

22. The apparatus of claim 21, wherein said display means includes a monitor.

23. The apparatus of claim 21, further comprising means for displaying the position of the bucket relative to the drop position.

24. The apparatus of claim 23, wherein said display means includes a monitor.

25. The apparatus of claim 21, further including means for automatically positioning the bucket such that the position of the bucket coincides with said drop position.

26. The apparatus of claim 25, further comprising means for displaying the position of the bucket relative to the drop position.

27. The apparatus of claim 26, wherein said display means includes a monitor.

28. The apparatus of claim 25, wherein said positioning means includes feedback-loop control apparatus.

29. The apparatus of claim 16, comprising four sensors.

30. The apparatus claim 16, wherein said means for calculating a position of a center of gravity of the pile of material currently loaded on the bed and means for providing a spatial indication of said position relative to a target point include global-positioning-system units.

31. The apparatus of claim 16, further including means for displaying the position of the center of gravity and the target point on a monitor; means for displaying a position of the bucket relative to the target point on said monitor; and means for calculating said drop position relative to the target point and displaying the drop position on the monitor.

* * * * *